US009971332B2

(12) United States Patent
Okuyama et al.

(10) Patent No.: US 9,971,332 B2
(45) Date of Patent: May 15, 2018

(54) INPUT/OUTPUT CONTROL DEVICE, INPUT/OUTPUT CONTROL METHOD, AND NON-TRANSITORY COMPUTER-READABLE MEDIUM FOR SELECTIVE ACTIVATION OF LOGICAL CIRCUITS

(71) Applicant: Mitsubishi Electric Corporation, Tokyo (JP)

(72) Inventors: Takumi Okuyama, Tokyo (JP); Naotoshi Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/501,268

(22) PCT Filed: Sep. 11, 2014

(86) PCT No.: PCT/JP2014/004673
§ 371 (c)(1),
(2) Date: Feb. 2, 2017

(87) PCT Pub. No.: WO2016/038645
PCT Pub. Date: Mar. 17, 2016

(65) Prior Publication Data
US 2017/0220020 A1  Aug. 3, 2017

(51) Int. Cl.
*G05B 19/05* (2006.01)
*G06F 13/38* (2006.01)
*G06F 15/78* (2006.01)

(52) U.S. Cl.
CPC ......... *G05B 19/054* (2013.01); *G06F 13/385* (2013.01); *G06F 15/7867* (2013.01);
(Continued)

(58) Field of Classification Search
None
See application file for complete search history.

(56) References Cited

U.S. PATENT DOCUMENTS 3,849,765 A * 11/1974 Hamano ............... G05B 19/045
712/246
5,237,652 A * 8/1993 McManus ............ G05B 19/056
700/18
(Continued)

FOREIGN PATENT DOCUMENTS

JP      H 5-334083 A      12/1993
JP       08076820 A  *    3/1996
(Continued)

OTHER PUBLICATIONS

'Programmable Logic Controllers' by Kelvin T. Erickson, copyright 1996, IEEE.*

(Continued)

*Primary Examiner* — Steven Snyder
(74) *Attorney, Agent, or Firm* — Sughrue Mion, PLLC; Richard C. Turner

(57) ABSTRACT

An input/output control device includes: a bus connected to an input interface; a plurality of circuit selectors which are connected to the bus and to which validity or invalidity of an operation is set, each circuit selector outputting a signal of the bus when the validity is set; a plurality of logical circuits which are respectively provided to each of the circuit selectors, each logical circuit performing a logical operation when a signal is inputted from the circuit selector; an output selector which is connected to the bus and to which validity or invalidity of an operation is set, the output selector outputting a signal of the bus to an output interface when the validity is set; and an operation part which validates or invalidates the plurality of circuit selectors or the output selector based on an operation order of the plurality of circuit selectors and the output selector.

10 Claims, 4 Drawing Sheets

(52) U.S. Cl.
CPC .............. *G05B 2219/1131* (2013.01); *G05B 2219/13187* (2013.01)

(56) References Cited

U.S. PATENT DOCUMENTS

| | | | |
|---|---|---|---|
| 5,754,823 A | 5/1998 | Mudryk, Jr. et al. | |
| 6,021,356 A * | 2/2000 | Chang ................ | G05B 19/052 219/110 |
| 6,028,809 A * | 2/2000 | Schleicher ....... | H03K 19/17704 365/230.03 |
| 6,058,448 A * | 5/2000 | Pawlowski ............ | G06F 13/14 365/189.05 |
| 6,107,825 A * | 8/2000 | Lane ................ | H03K 19/17744 326/39 |
| 6,812,871 B2 * | 11/2004 | Wu ........................ | G05B 19/05 341/144 |
| 7,200,448 B2 * | 4/2007 | Cachat ............... | G05B 19/0426 700/17 |
| 7,644,220 B2 * | 1/2010 | Moriyama ........... | G05B 19/054 710/104 |
| 8,521,332 B2 * | 8/2013 | Tiemann .............. | G05B 19/056 165/155 |
| 2003/0100958 A1 * | 5/2003 | Cachat ............... | G05B 19/0426 700/18 |
| 2004/0189495 A1 * | 9/2004 | Wu ........................ | G05B 19/05 341/99 |
| 2005/0222696 A1 | 10/2005 | Ozaki et al. | |
| 2006/0079970 A1 * | 4/2006 | Ward ................... | G05B 19/056 700/86 |
| 2006/0155969 A1 | 7/2006 | Yoda et al. | |
| 2006/0253626 A1 * | 11/2006 | Ueno ................... | G05B 19/058 710/62 |
| 2008/0058962 A1 * | 3/2008 | Ward ................... | G05B 19/056 700/17 |
| 2009/0070514 A1 | 3/2009 | Moriyama et al. | |
| 2011/0153089 A1 * | 6/2011 | Tiemann .............. | G05B 19/056 700/276 |
| 2011/0314258 A1 * | 12/2011 | Vogel ................... | G05B 19/056 712/32 |
| 2012/0226836 A1 * | 9/2012 | Takahashi .......... | H03K 19/0016 710/107 |

FOREIGN PATENT DOCUMENTS

| | | | |
|---|---|---|---|
| JP | H 8-69355 A | | 3/1996 |
| JP | 10240315 A | * | 9/1998 |
| JP | 2005275938 A | | 10/2005 |
| JP | 2006197023 A | | 7/2006 |
| JP | 2008310536 A | | 12/2008 |
| JP | 200969864 A | | 4/2009 |
| WO | WO 2016121038 A1 | * | 8/2016 ............. G05B 19/05 |

OTHER PUBLICATIONS

International Search Report dated Dec. 2, 2014, issued by the International Searching Authority in counterpart International Application No. PCT/JP2014/004673 (PCT/ISA/210).

Written Opinion dated Dec. 2, 2014, issued by the International Searching Authority in counterpart International Application No. PCT/JP2014/004673 (PCT/ISA/220 & 237).

Office Action dated January Jan. 10, 2017, issued by the Japanese Intellectual Property Office in counterpart Japanese Application No. 2016-546539.

Office Action dated Nov. 24, 2017 by the State Intellectual Property Office of P.R. China in counterpart Chinese Patent Application No. 201480081523.1.

Communication dated Feb. 2, 2018, from counterpart German Patent Application No. 11 2014 006 947.7.

* cited by examiner

| ADDRESS | DATA |
|---|---|
| 0 | OPERATION STATE FLAG |
| 1 | MEASUREMENT DATA |
| 2 | SETTING PARAMETER |
| 3 | OPERATION DATA |
| ⋮ | ⋮ |
| N | |

INPUT/OUTPUT CONTROL DEVICE, INPUT/OUTPUT CONTROL METHOD, AND NON-TRANSITORY COMPUTER-READABLE MEDIUM FOR SELECTIVE ACTIVATION OF LOGICAL CIRCUITS

TECHNICAL FIELD

The present invention relates to an input/output control device for performing input/output control of a programmable logic controller, an input/output control method, and a program for executing the input/output control.

BACKGROUND ART

A general programmable logic controller contains a microprocessor and is connected to electronic loads such as various kinds of actuators and display devices. The programmable logic controller drives and controls the electronic loads according to a sequence program stored in a memory and operation states of the electronic loads represented by input signals that are sent from operation switches, various kinds of sensors, etc.

A programmable logic controller of a related art is used together with a special unit which mounts an integrated circuit element and an input/output interface circuit each for performing high-speed input/output processing. The special unit operates as an input/output control device. The integrated circuit element mounted on the special unit includes a parameter memory and a logic circuit part. Operation specification of each of the parameter memory and the logic circuit part is determined according to content of a special instruction within a program memory. A reversible counter constituting the logic circuit part is used for both the high-speed input processing and the high-speed output processing (see Patent Document 1, for example).

PRIOR ART DOCUMENT

Patent Document

Patent Document 1: JP-A-2009-069864 (paragraphs 0013, 0050, 0051, 0121 and FIG. 4)

SUMMARY OF INVENTION

Problems to be Solved by Invention

In the programmable logic controller of the related art, the special unit (hereinafter referred to as an input/output control device) executes optional ones of various functions realized by the programmable logic controller. Thus a user can easily use and effectively execute a predetermined function. In contrast, there is a problem that a user cannot modify the function of the special unit or add any function not set in the special unit.

The present invention is performed in view of the aforesaid circumstances and an object of the present invention is to provide an input/output control device, an input/output control method and a program for a programmable logic controller, which can be handled easily and realize various functions.

Means for Solving Problems

An input/output control device of the present invention includes: a bus which is connected to an input interface to which a signal is inputted from outside: a plurality of circuit selectors which are connected to the bus and to which validity or invalidity of an operation is set, each circuit selector outputting a signal of the bus when the validity is set but not outputting the signal of the bus when the invalidity is set: a plurality of logical circuits which are respectively provided to each of the circuit selectors, each logical circuit performing a logical operation when a signal is inputted from the circuit selector and outputting a signal representing an operation result to the bus; an output selector which is connected to the bus and to which validity or invalidity of an operation is set, the output selector outputting a signal of the bus to an output interface when the validity is set but not outputting the signal of the bus to the output interface when the invalidity is set; and an operation part which validates or invalidates the plurality of circuit selectors or the output selector based on an operation order of the plurality of circuit selectors and the output selector.

An input/output control method of the present invention includes: an input step of receiving input of a signal to a bus that is connected to an input interface to which a signal is inputted from outside; a circuit selection step of validating an optional circuit selector among a plurality of circuit selectors connected to the bus, thereby causing the optional circuit selector to output a signal of the bus; an operation step of causing, among a plurality of logical circuits respectively provided to each of the circuit selectors, a logical circuit, to which a signal is inputted from the circuit selector, to perform a logical operation and output a signal to the bus; and an output step of validating an output selector connected to the bus, thereby causing the output selector to output a signal of the bus to an output interface.

A program of the present invention is a program installed in an input/output control device which executes a predetermined operation according to a signal inputted from an input interface and outputs a signal from an output interface, the program causing an operation part of the input/output control device to execute: a circuit selection step of, when a signal is inputted to a bus connected to the input interface, validating an optional circuit selector among a plurality of circuit selectors connected to the bus, thereby causing the optional circuit selector to output a signal of the bus; an operation step of causing, among a plurality of logical circuits respectively provided to each of the circuit selectors, a logical circuit, to which a signal is inputted from the circuit selector, to perform a logical operation and output a signal to the bus; and an output step of validating an output selector connected to the bus, thereby causing the output selector to output a signal of the bus to the output interface.

Advantageous Effects of Invention

The present invention can provide the input/output control device, the input/output control method and the program for the programmable logic controller, which can be handled easily and realize various functions.

EMBODIMENT OF INVENTION

First Embodiment

Figure 1:
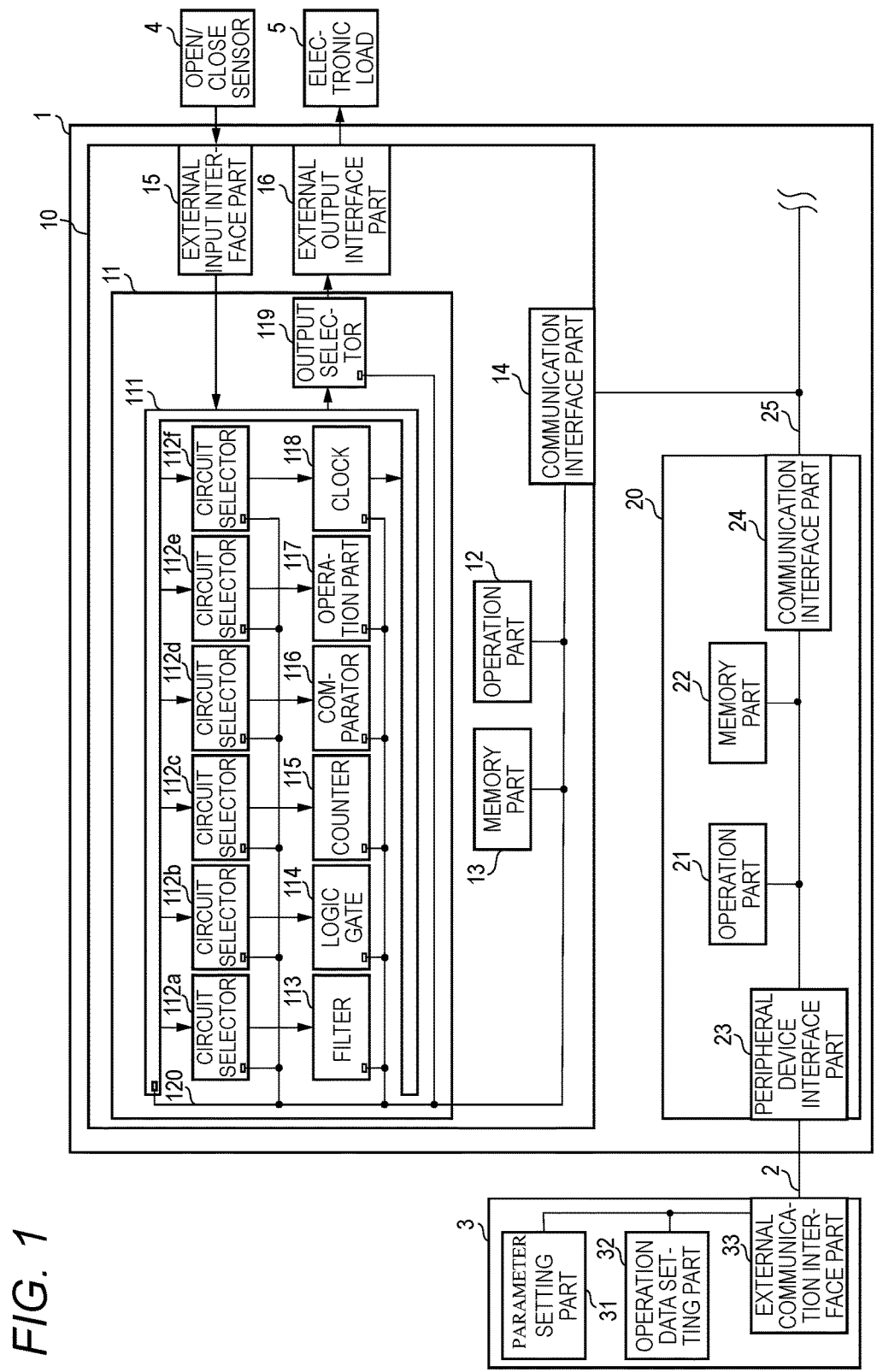
FIG. 1 shows a block diagram illustrating configuration of a programmable logic controller in the first embodiment.

FIG. 1 is a block diagram illustrating configuration of a programmable logic controller in the first embodiment. Explanation will be made with reference to FIG. 1 as to the programmable logic controller which includes an input/output control device according to the first embodiment. The present invention is not limited by the first embodiment.

[Configuration of Programmable Logic Controller 1]

In the first embodiment, the programmable logic controller 1 is connected to a peripheral device 3 via a connection cable 2. The programmable logic controller 1 is also connected to an open/close sensor 4 and an electronic load 5.

The open/close sensor 4 is, for example, an encoder such as a rotary encoder which is attached to a motor and detects a rotation angle of the motor. The electronic load 5 is, for example, a valve such as an electromagnetic valve or a motor.

The programmable logic controller 1 further includes an input/output control device 10 and a CPU device 20.

[Configuration of Input/output Control Device 10]

The input/output control device 10 includes a general-purpose logic part 11, an operation part 12, a memory part 13, a communication interface part 14, an external input interface part 15 and an external output interface part 16.

The general-purpose logic part 11 includes a plurality of circuit selectors and a plurality of circuit elements as described later, and thus provides various functions coping with original operation setting by a user.

The operation part 12 is a central processing unit (CPU) which controls an entire operation of the input/output control device 10. As described later, the operation part 12 makes operation setting of each of individual selectors valid or invalid based on operation data representing an operation order of the individual selectors, and further makes each of the circuit elements perform a logical operation according to setting parameters representing individual operations of the circuit elements. Both the operation data of the selectors and the setting parameters of the circuit elements are set in advance, as described later.

The memory part 13 is a memory such as an RAM and stores data which is used by the operation part 12 to control an operation of the general-purpose logic part 11. As described later, the memory part 13 stores the operation data representing the operation order of the individual selectors, the setting parameters representing operations of the individual circuit elements, an operation state flag and measurement data.

The communication interface part 14 is an interface for performing communication with the CPU device 20.

The external input interface part 15 is connected to the general-purpose logic part 11 and the open/close sensor 4. The external input interface part 15 receives a signal from the open/close sensor 4 and outputs a signal corresponding to the signal from the open/close sensor 4 to the general-purpose logic part 11. The external output interface part 16 is connected to the general-purpose logic part 11 and the electronic load 5. The external output interface part 16 receives a signal from the general-purpose logic part 11 and outputs a signal corresponding to the signal from the general-purpose logic part 11 to the electronic load 5.

The general-purpose logic part 11 of the input/output control device 10 includes a circuit switching bus 111, circuit selectors 112a, 112b, 112c, 112d, 112e, 112f, a filter 113, a logic gate 114, a counter 115, a comparator 116, an operation part 117, a clock 118, an output selector 119 and an operation setting bus 120.

Hereinafter, the circuit selectors 112a, 112b, 112c, 112d, 112e and 112f are also collectively referred to as circuit selectors 112. Further the filter 113, the logic gate 114, the counter 115, the comparator 116, the operation part 117 and the clock 118 are also collectively referred to as circuit elements. Logic circuits represent the circuit elements in the first embodiment.

The external input interface part 15, the circuit selectors 112, the circuit elements and the output selector 119 are connected to the circuit switching bus 111.

Individual parameters are set to the circuit selectors 112. Each of the circuit selectors controls approval/disapproval of outputting of a signal according to the parameter set thereto. That is, each of the circuit selectors 112 outputs a signal of the circuit switching bus 111 to the corresponding circuit element when the parameter representing that the operation setting is valid is set. In contrast, each of the circuit selectors 112 does not output a signal of the circuit switching bus 111 to the corresponding circuit element when the parameter representing that the operation setting is invalid is set.

The circuit elements are respectively provided to each of the circuit selectors 112. When a signal is inputted from the corresponding circuit selector 112, the circuit element performs a logical operation according to the parameter set in advance and outputs a signal to the circuit switching bus 111.

A parameter is set to the output selector 119. The output selector controls approval/disapproval of outputting of a signal according to the parameter set thereto. That is, the output selector 119 outputs a signal of the circuit switching bus 111 to the external output interface part 16 when the parameter representing that the operation setting is valid is set. In contrast, the output selector 119 does not output a signal of the circuit switching bus 111 to the external output interface part 16 when the parameter representing that the operation setting is invalid is set.

The circuit selectors 112 respectively provided to each of the circuit elements and the output selector 119 are also collectively referred to as individual selectors.

The operation part 12, the memory part 13, the communication interface part 14, the circuit selectors 112, the individual circuit elements and the output selector 119 are connected to the operation setting bus 120. The operation part 12 transmits the operation data of the individual selectors stored in the memory part 13 to the circuit selectors 112 and the output selector 119 via the operation setting bus 120, thereby setting or changing the parameters of the individual selectors. Further the operation part 12 transmits the setting parameters of the circuit elements stored in the memory part 13 to the circuit elements, thereby setting or changing the parameters of the circuit elements.

When a signal is inputted from the open/close sensor 4 via the external input interface part 15, the general-purpose logic part 11 controls the circuit selectors 112, the circuit elements and the output selector 119 to perform a logical operation as described above and outputs a signal to the electronic load 5 via the external output interface part 16.

[Configuration of CPU Device 20]

The CPU device 20 includes an operation part 21, a memory part 22, a peripheral device interface part 23 and a communication interface part 24.

The operation part 21 is a central processing unit (CPU) which controls an entire operation of the CPU device 20. Further the operation part 21 controls the electronic load 5 connected to the programmable logic controller 1 based on a user program and data used upon executing the user program. The user program is a program for controlling the electronic load 5 as a control object of the programmable logic controller 1. For example, the user program is a ladder program or a C language program.

The memory part 22 is a memory such as an ROM and stores data which is used by the operation part 21 to control the electronic load 5. As described later, the memory part 22 stores the user program, data used for executing the user program and data representing execution results of the user program.

The peripheral device interface part 23 is an interface for performing communication with the peripheral device 3. The communication interface part 24 is an interface for performing communication with the input/output control device 10.

An inter-device bus 25 is connected between the communication interface part 14 of the input/output control device 10 and the communication interface part 24 of the CPU device 20. The input/output control device 10 and the CPU device 20 are connected via the communication interface part 14, the inter-device bus 25 and the communication interface part 24.

The operation part 21 reads and executes the user program stored in the memory part 22. Further the operation part 21 stores content of the read user program into the memory part 13 of the input/output control device 10 via the communication interface part 24 and the communication interface part 14. The operation part 12 of the input/output control device 10 sets or changes the setting parameters representing the operations of the individual circuit elements stored in the memory part 13, in order to make the input/output control device 10 execute an operation instructed by the user program based on content of the extended user program.

The operation part 21 repeatedly performs, with a predetermined control period, execution of the user program stored in the memory part 22, reading of the data used for executing the user program from the memory part 22 and writing of the execution results of the user program into the memory part 22. Upon the reading of data used for executing the user program, the operation part 21 of the CPU device 20 obtains operation setting of the individual circuit elements and control result data of the general-purpose logic part 11 from the memory part 13 of the input/output control device 10. The operation setting of the individual circuit elements is, for example, a count permission instruction and a reset instruction of a count value for the counter 115. The control result data is, for example, the count value of the counter 115, and so on.

The programmable logic controller 1 may further include additional devices for expanding the function in addition to the input/output control device 10 and the CPU device 20. Examples of the additional device are a motion controller device which realizes multi-shaft position control by controlling servo amplifiers and a temperature controller device which outputs a temperature control signal based on an instruction from the input/output control device 10. These additional devices are also connected mutually via the inter-device bus 25.

[Configuration of Peripheral Device 3]

The peripheral device 3 includes a parameter setting part 31, an operation data setting part 32 and an external communication interface part 33.

The parameter setting part 31 is a graphical user interface (GUI) which accepts a user's operation. The parameter setting part 31 prepares a user program with respect to the programmable logic controller 1 according to a user's operation. The parameter setting part 31 outputs the prepared user program to the programmable logic controller 1 via the external communication interface part 33 and the connection cable 2, and thus the user program is stored in the memory part 22 of the CPU device 20.

Further the parameter setting part 31 displays various data outputted from the programmable logic controller 1 on a display screen and monitors the data.

The operation data setting part 32 is a graphical user interface (GUI) which receives a user's operation. The operation data setting part 32 sets setting parameters representing parameters of the individual circuit elements of the general-purpose logic part 11 according to a user's operation. Further the operation data setting part 32 sets the operation data representing the operation order of the individual selectors of the general-purpose logic part 11 according to a user's operation.

The operation data setting part 32 outputs the setting parameters of the individual circuit elements and the operation data of the individual selectors of the general-purpose logic part 11 to the programmable logic controller 1 via the external communication interface part 33 and the connection cable 2, and thus the setting parameters and the operation data are stored in the memory part 13 of the input/output control device 10 via the peripheral device interface part 23, the communication interface part 24, the inter-device bus 25 and the communication interface part 14. The operation data setting part 32 includes a function for simulating the operation of the general-purpose logic part 11.

The parameter setting part 31 and the operation data setting part 32 are provided within the peripheral device 3 by installing a program containing a programming tool and a general-purpose circuit block setting tool in the peripheral device 3. Alternatively the parameter setting part 31 and the operation data setting part 32 may be realized as hardware by providing an operation part, a memory part, etc. within the peripheral device 3.

[Configuration of General-Purpose Logic Part 11]

Figure 2:
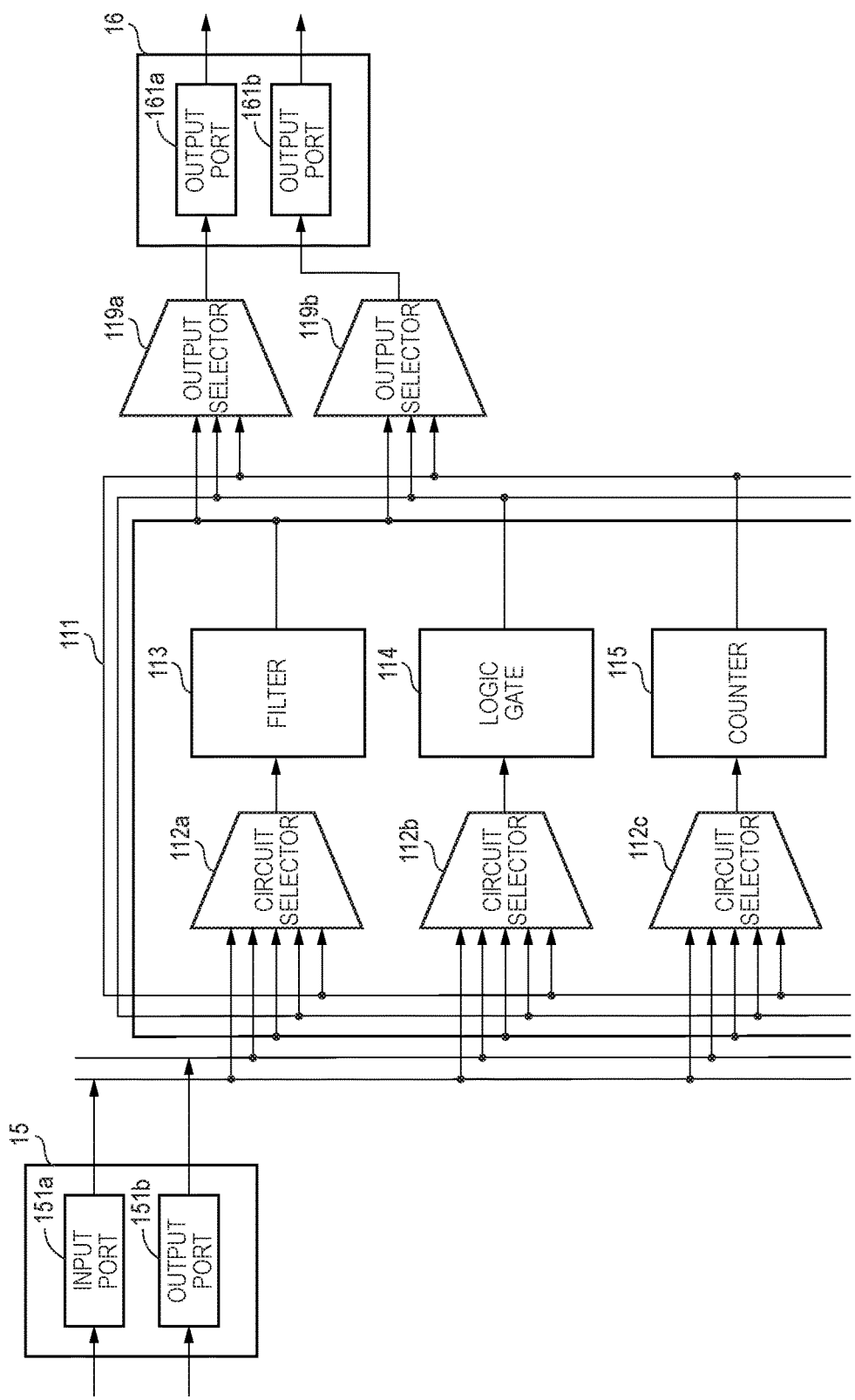
FIG. 2 shows a block diagram illustrating a connection state of signal lines in a general-purpose logic part of an input/output control device according to the first embodiment.

FIG. 2 is a block diagram illustrating a connection state of signal lines in the general-purpose logic part 11 of the input/output control device according to the first embodiment. Although, for convenience of explanation, FIG. 2 illustrates configuration in which the general-purpose logic part 11 includes the filter 113, the logic gate 114 and the counter 115 as the circuit elements, the general-purpose logic part 11 may further include the comparator 116, the operation part 117, the clock 118 shown in FIG. 1, and other circuit elements.

The external input interface part 15 includes two input ports 151a, 151b, and the external output interface part 16 includes two output ports 161a, 161b. In FIG. 2, for convenience of explanation, the number of inputs from the outside is two, that is, the input ports are 151a, 151b, and the number of outputs to the outside is two, that is, the output ports are 161a, 161b. However the number of each of the input ports and the output ports may be three or more.

The output selectors 119a, 119b of FIG. 2 are collectively referred to as the output selector 119 in FIG. 1.

The external input interface part 15 supplies to the circuit switching bus 111 either one of a signal inputted into the input port 151a and a signal inputted into the input port 151b from the outside. Output destination of the signal thus inputted into the circuit switching bus 111 is determined by the circuit selectors 112a. 112b, 112c. That is, the signal inputted into the circuit switching bus 111 is outputted to the filter 113 when the circuit selector 112a is valid, to the logic gate 114 when the circuit selector 112b is valid, or to the counter 115 when the circuit selector 112c is valid.

Each of the circuit elements executes, in response to input of a signal from the corresponding circuit selector 112, an operation according to the parameter set to the circuit element in advance and outputs a signal to the circuit switching bus 111. The signal outputted to the circuit switching bus 111 is supplied again to the circuit selectors 112a, 112b, 112c via the circuit switching bus 111. In this case, the signal can be supplied again to an optional one of the circuit elements by switching validity/invalidity of each of the circuit selectors 112a, 112b, 112c.

By setting the output selector 119a or 119b to be valid after the optional circuit element executes a predetermined operation, the external output interface part 16 outputs a signal to the outside via the output port 161a or 161b.

In the general-purpose logic part 11 according to the first embodiment, the external input interface part 15, the circuit selectors 112, the individual circuit elements and the output selectors 119 are connected to the circuit switching bus 111. It is possible to make the circuit elements perform respective logical operations in an optional order by optionally switching validity/invalidity of each of the circuit selectors 112 and the output selectors 119. In this case, it is also possible to input the signal again into the same circuit element without switching the validity/invalidity of each of the circuit selectors 112 and the output selectors 119, thereby executing the same logical operation again. Further, by optionally switching validity/invalidity of each of the circuit selectors 112 and the output selectors 119, it is also possible, after making one of the circuit elements execute a logical operation and then making another of the circuit element execute a logical operation, to make the one circuit element execute the logical operation again.

[Configuration of Memory Part 13]

Figures 3, 4:
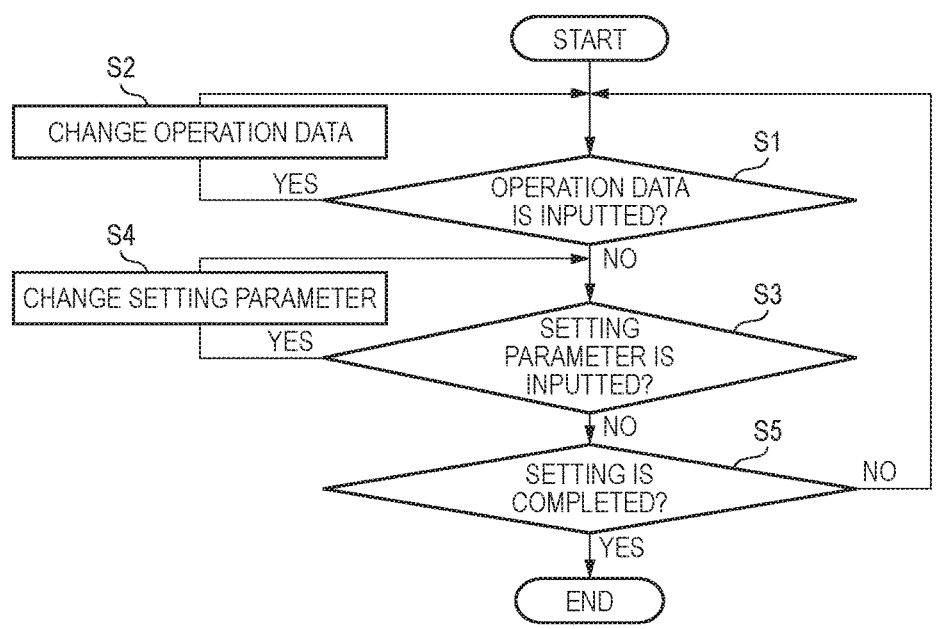
FIG. 3 shows a conceptual diagram illustrating configuration of a memory part of the input/output control device according to the first embodiment.
FIG. 4 shows a flowchart illustrating a procedure for setting an operation of the general-purpose logic part in advance by a user in the first embodiment.

FIG. 3 is a conceptual diagram illustrating configuration of the memory part of the input/output control device according to the first embodiment. The configuration of the memory part 13 of the input/output control device 10 according to the first embodiment will be explained with reference to FIG. 3.

The operation state flag is a flag representing a state of the input/output control device 10 such as operation start or operation change. The memory part 13 stores a flag representing the operation start or the operation change as the operation state flag when an operation start instruction or an operation change instruction is inputted from the parameter setting part 31 or the CPU device 20. Further the memory part 13 stores a flag representing completion of an operation or completion of setting change as the operation state flag when a completion notice or a setting change completion notice of an operation of the input/output control device 10 is inputted from the operation part 12. The operation part 12 informs the CPU device 20 of the completion of operation or the completion of setting change based on the operation state flag stored in the memory part 13. The CPU device 20 stores the state of the input/output control device 10 such as the completion of operation or the completion of setting change thus informed in the memory part 22.

The measurement data is data acquired by the input/output control device 10 or data as an operation result of the input/output control device 10 when the programmable logic controller 1 executes the user program. For example, the measurement data is a frequency of a signal inputted from the electronic load 5 or a rotation speed of the motor connected as the electronic load 5. The memory part 13 stores, as the measurement data, the data acquired by the input/output control device 10 or the data as an operation result of the input/output control device 10. The operation part 12 informs the CPU device 20 of the data acquired by the input/output control device 10 or the data as an operation result of the input/output control device 10 based on the measurement data stored in the memory part 13, and then the data thus informed is stored in the memory part 22. The parameter setting part 31 of the peripheral device 3 can monitor the data acquired by the input/output control device 10 or the data as an operation result of the input/output control device 10 which is stored in the memory part 22.

The setting parameters represent the parameters of the individual circuit elements. For example, the setting parameters are characteristic data of the filter 113 and an operation mode of the counter 115 of the general-purpose logic part 11. The operation part 12 informs the CPU device 20 of the parameters of the individual circuit elements stored in the memory part 13, and then the parameters thus informed are stored in the memory part 22 of the CPU device 20. The CPU device 20 monitors and changes the parameters of the individual circuit elements stored in the memory part 22. The parameter setting part 31 or the operation data setting part 32 of the peripheral device 3 can also monitor and change the parameters of the individual circuit elements stored in the memory part 22.

The operation data is data for making the general-purpose logic part 11 execute the predetermined logical operations. That is, the operation data is data representing a switching order of the validity/invalidity concerning the operating setting of the circuit selectors 112 and the output selectors 119. When a user inputs the operation data of the individual selectors into the operation data setting part 32, the operation data setting part 32 outputs the operation data of the individual selectors, and then the outputted operation data is stored in the memory part 13. The operation part 12 transmits the operation data stored in the memory part 13 to the circuit selectors 112 and the output selectors 119, thereby setting or changing the parameters representing contents of the operation setting of the selectors. Thus a user can easily cause the general-purpose logic part 11 to perform various functions necessary for the input/output control device 10 to execute high-speed input/output control.

[Setting Procedure of Operation of General-purpose Logic Part 11]

FIG. 4 is a flowchart illustrating a procedure for setting the operation of the general-purpose logic part by a user in advance. Explanation will be made with reference to FIG. 4 as to a method of setting the operation of the general-purpose logic part 11 to realize the various functions required by a user.

In step S1, the operation data setting part 32 of the peripheral device 3 determines whether or not an instruction for setting the operation data of the circuit selector 112 or the output selector 119 is inputted. If the instruction for setting the operation data of the selector is inputted by a user, the operation data setting part 32 sets or changes the operation data of the selector according to the inputted content in step S2. Further the peripheral device 3 outputs the operation data of the selector thus set or changed from the external communication interface part 33, and then the outputted operation data is stored in the memory part 13 of the input/output control device 10 via the connection cable 2, the peripheral device interface part 23, the communication interface part 24, the inter-device bus 25 and the communication interface part 14.

In step S1, if the instruction for setting the operation data of the selector is not inputted by a user, the processing proceeds to step S3.

In step S3, the operation data setting part 32 of the peripheral device 3 determines whether or not an instruction for setting the parameter of the circuit element is inputted. If the instruction for setting the parameter of the circuit element is inputted by a user, the operation data setting part 32 sets or changes the parameter of the circuit element according to the inputted content in step S4. Further the peripheral device 3 outputs the parameter of the circuit element thus set or changed from the external communication interface part 33, and then the outputted parameter is stored in the memory part 13 of the input/output control device 10 via the connection cable 2, the peripheral device interface part 23, the communication interface part 24, the inter-device bus 25 and the communication interface part 14.

In step S3, if the instruction for setting the parameter of the circuit element is not inputted by a user, the processing proceeds to step S5.

In step S5, the operation data setting part 32 of the peripheral device 3 determines whether or not an instruction for completing the setting of operation of the general-purpose logic part 11 is inputted. If the instruction for completing the setting of operation of the general-purpose logic part 11 is not inputted, the processing returns to step S1. If the instruction for completing the setting of operation of the general-purpose logic part 11 is inputted, the setting processing is completed.

[Procedure for Executing User Program]

Figure 5:
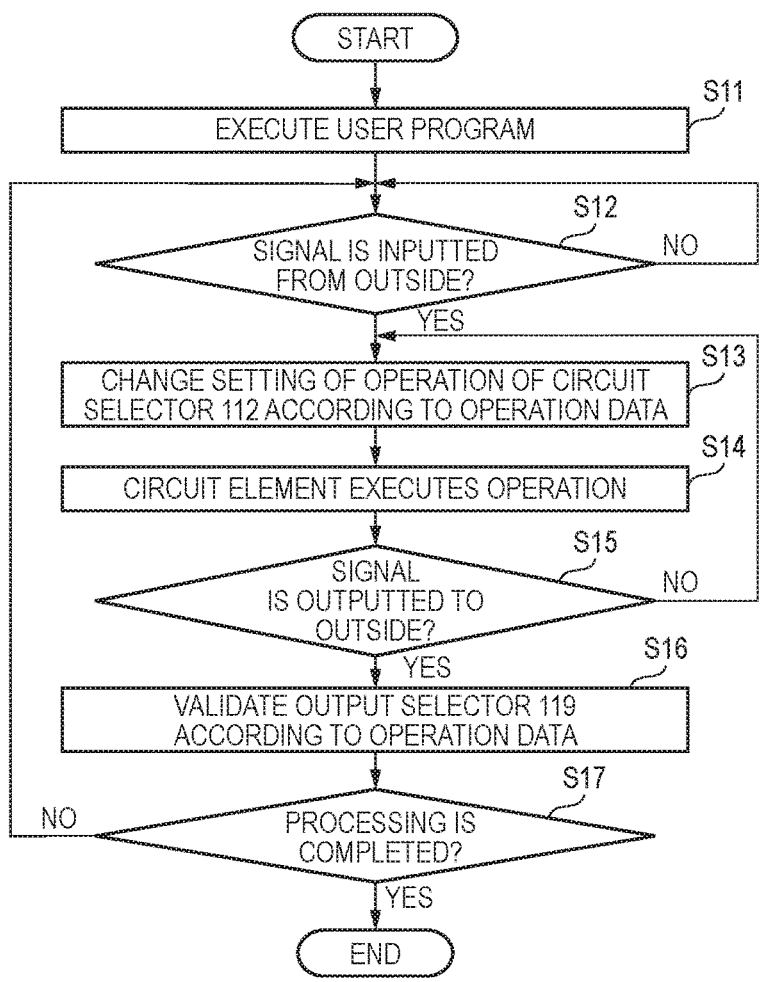
FIG. 5 shows a flowchart illustrating a procedure of an operation in a case where the programmable logic controller in the first embodiment executes a user program.

FIG. 5 is a flowchart illustrating a procedure of an operation in a case where the programmable logic controller in the first embodiment executes the user program. Explanation will be made with reference to FIG. 5 as to an operation in the case where the programmable logic controller 1 executes the user program.

In step S11, the peripheral device 3 outputs the user program prepared by the parameter setting part 31 from the external communication interface part 33, and then the outputted user program is stored in the memory part 22 of the CPU device 20 via the connection cable 2 and the peripheral device interface part 23. The operation part 21 of the CPU device 20 executes the user program stored in the memory part 22, whereby the input/output control device 10 performs the predetermined operation to control the electronic load 5 connected to the input/output control device 10. In this case, the operation part 12 of the input/output control device 10 causes the general-purpose logic part 11 to execute a predetermined logical operation in order to execute the predetermined operation instructed from the operation part 21 of the CPU device 20.

Explanation will be made with reference to FIGS. 1 and 2 as to an operation for causing the general-purpose logic part 11 to execute the predetermined logical operation. For example, explanation will be made as to a case where, in FIG. 2, a signal received from the input port 151a is inputted into the filter 113, the logic gate 114 and the counter 115 in this order and then outputted from the output port 161b.

In step S12 of FIG. 5, the operation part 12 of the input/output control device 10 determines whether or not a signal is inputted from the external open/close sensor 4 or the like. If determination is made that the signal is inputted from the external open/close sensor 4 or the like, the operation part 12 makes the general-purpose logic part 11 execute the predetermined logical operation with respect to the inputted signal. In the case of aforesaid example, after the signal is inputted from the open/close sensor 4, the input port 151a shown in FIG. 2 outputs the signal inputted from the open/close sensor 4 to the circuit switching bus 111.

In step S13 of FIG. 5, the operation part 12 of the input/output control device 10 changes the parameter of the circuit selector 112 according to the operation data stored in the memory part 13. In the case of aforesaid example, the operation part 12 changes the setting parameter of the circuit selector 112a of the general-purpose logic part 11 via the operation setting bus 120 shown in FIG. 1 based on the operation data stored in the memory part 13. Consequently the circuit selector 112a is set to be valid and thus outputs a signal.

In step S14 of FIG. 5, the operation part 12 of the input/output control device 10 changes the parameter of the circuit element according to the setting parameter stored in the memory part 13. In the case of aforesaid example, the operation part 12 sets the parameter to the filter 113 of the general-purpose logic part 11 via the operation setting bus 120 shown in FIG. 1 based on the setting parameter stored in the memory part 13. The filter 113 executes the logical operation with respect to the inputted signal based on this parameter and outputs an operation result as a signal.

In step S15 of FIG. 5, the operation part 12 of the input/output control device 10 determines whether or not the next instruction of the operation data stored in the memory part 13 is an instruction for validating the operation setting of the output selector 119. The instruction for validating the operation setting of the output selector 119 means an instruction for outputting the operation result of the circuit element of the general-purpose logic part 11 to the outside. In the case of aforesaid example, the counter 115 of the general-purpose logic part 11 has not executed the predetermined logical operation, and hence a signal is not output to the outside yet. Thus the determination is made to be NO and the processing returns to step S13.

In step S13 of FIG. 5, the operation part 12 changes the setting parameters of the circuit selectors 112a and 112b of the general-purpose logic part 11 via the operation setting bus 120 shown in FIG. 1 based on the operation data stored in the memory part 13. Consequently the circuit selector 112a is set to be invalid and thus does not output a signal of the circuit switching bus 111 to the filter 113, whilst the circuit selector 112b is set to be valid and thus outputs the signal of the circuit switching bus 111 to the logic gate 114.

In step S14 of FIG. 5, the operation part 12 sets the parameter to the logic gate 114 of the general-purpose logic part 11 via the operation setting bus 120 shown in FIG. 1 based on the setting parameter stored in the memory part 13. The logic gate 114 executes the logical operation with respect to the inputted signal based on this parameter and outputs an operation result as a signal.

Again in step S15, the counter 115 of the general-purpose logic part 11 has not executed the predetermined logical operation, and hence a signal is not output to the outside yet. Thus the determination is made to be NO again and the processing returns to step S13.

In step S13 of FIG. 5, the operation part 12 changes the setting parameters of the circuit selectors 112b and 112c of the general-purpose logic part 11 via the operation setting bus 120 shown in FIG. 1 based on the operation data stored in the memory part 13. Consequently the circuit selector 112*b* is set to be invalid and thus does not output the signal of the circuit switching bus 111 to the logic gate 114, whilst the circuit selector 112*c* is set to be valid and thus outputs the signal of the circuit switching bus 111 to the counter 115.

In step S14 of FIG. 5, the operation part 12 sets the parameter to the counter 115 of the general-purpose logic part 11 via the operation setting bus 120 shown in FIG. 1 based on the setting parameter stored in the memory part 13. The counter 115 executes the logical operation with respect to the inputted signal based on this parameter and outputs an operation result to the circuit switching bus 111 as a signal.

In step S15 of FIG. 5, if the next instruction of the operation data stored in the memory part 13 is an instruction for validating the operation setting of the output selector 119, the operation part 12 determines that this instruction is an instruction for outputting an operation result of the circuit element of the general-purpose logic part 11 to the outside and the processing proceeds to step S16.

In step S16 of FIG. 5, the operation part 12 of the input/output control device 10 changes the parameter of the circuit selector 119 according to the operation data stored in the memory part 13. In the case of aforesaid example, the operation part 12 changes the setting parameters of the circuit selector 112*c* of the general-purpose logic part 11 and the output selector 119*b* via the operation setting bus 120 shown in FIG. 1 based on the operation data stored in the memory part 13. Consequently the circuit selector 112*c* is set to be invalid and thus does not output the signal of the circuit switching bus 111 to the counter 115, whilst the output selector 119*b* is set to be valid and thus outputs the signal of the circuit switching bus 111 to the output port 161*b*. The output port 161*b* shown in FIG. 2 outputs the signal received from the output selector 119*b* to the outside.

In step S17 of FIG. 5, the operation part 21 of the CPU device 20 determines whether or not the execution of the user program is completed. If the execution of the user program is not completed yet, the processing returns to step S12. If the execution of the user program is completed, the programmable logic controller 1 terminates the processing.

In this manner, the general-purpose logic part 11 can cause the filter 113, the logic gate 114 and the counter 115 to execute the logical operations in this order with respect to the signal inputted from the input port 151*a* and then output a signal from the output port 161*b*.

In the general-purpose logic part 11 according to the first embodiment, although FIG. 2 shows only the filter 113, the logic gate 114 and the counter 115 as the circuit elements, optional one or all of the comparator 116, the operation part 117 and the clock 118 shown in FIG. 1 may be additionally contained as the circuit elements. In this case, logical operations of these additional circuit elements can be added by inputting signals via the circuit selectors 112 corresponding to these additional circuit elements and the circuit switching bus 111 associated therewith.

The general-purpose logic part 11 in the first embodiment may further include circuit selectors 112 corresponding to other circuit elements and a circuit switching bus 111 associated therewith. In this case, the general-purpose logic part can cope with various user-original unit operation modes by using these individual circuit elements in a free-combination thereof.

As explained above, the input/output control device 10 of the programmable logic controller 1 according to the first embodiment can cause the circuit elements to execute the respective logical operations in an optional order by optionally changing validity/invalidity of each of the circuit selectors 112 and the output selectors 119. Thus a user can easily cause the general-purpose logic part 11 to perform various functions necessary for the input/output control device 10 to execute the high-speed input/output control. The general-purpose logic part 11 according to the first embodiment can realize various functions required for the high-speed input/output control such as pulse counting, frequency measurement, high-accuracy timer, PWM outputting, timing generation, and so on.

Further as the various control is realized by merely changing the operation data of the individual selectors and the parameters of the individual circuit elements of the general-purpose logic part 11, it is not necessary to rewrite an internal circuit of the circuit element to change the function of the circuit element, and hence the number of design processes required for a user can be reduced. Further, since the general-purpose logic part 11, in which the operation data of the individual selectors and the parameters of the individual circuit elements are changed and then verification is performed as to various functions, is used, quality of products of a manufacturing company can be ensured.

Furthermore the input/output control at a high speed of microsecond order and with stable control timing, which cannot be performed by software logic such as a ladder program, is made possible. Thus the high-speed input/output control, which could have been realized only by a microcomputer board or the like mounting a dedicated hardware logic, can be realized easily by a general-purpose programmable logic controller.

In the first embodiment, the operation data is defined as data representing the switching order of validity/invalidity with respect to the operation setting of the circuit selectors 112 and the output selectors 119. Further, the operation part 12 of the input/output control device 10 according to the first embodiment determines in step S15 of FIG. 5 whether or not the next instruction of the operation data stored in the memory part 13 is an instruction for validating the operation setting of the output selector 119. Then, if the next instruction is an instruction for validating the operation setting of the output selector 119, in step S16 of FIG. 5, the operation part 12 changes the parameter of the output selector 119 according to the operation data stored in the memory part 13. However the operation data in this embodiment is not limited thereto.

For example, the operation data stored in the memory part 13 may include only the switching order of operation setting of the circuit selectors 112, and the operation part 12 may change the parameters of the circuit selectors 112 based on the operation data stored in the memory part 13. In this case, if the determination is made in step S15 of FIG. 5 that the circuit element of the general-purpose logic part 11 has executed the predetermined logical operation based on the operation data stored in the memory part 13, the operation part 12 changes the parameter of the output selector 119 to cause this output selector to output a signal to the electronic load 5 in step S16 of FIG. 5. In such case, the aforesaid effect of the first embodiment can also be attained.

Further in the first embodiment, the circuit selector 112 outputs the signal of the circuit switching bus 111 to the circuit element when the parameter representing that the operation setting is valid is set thereto, whilst does not output the signal of the circuit switching bus 111 to the circuit element when the parameter representing that the operation setting is invalid is set thereto. Similarly the output selector 119 outputs the signal of the circuit switching bus 111 to the external output interface part 16 when the parameter representing that the operation setting is valid is set thereto, whilst does not output the signal of the circuit switching bus 111 to the external output interface part 16 when the parameter representing that the operation setting is invalid is set thereto. However the operation of each of the circuit selectors 112 and the output selectors 119 in the first embodiment is not limited thereto.

For example, only the parameter representing that the operation setting is valid may be set to each of the circuit selectors 112 and the output selectors 119. In this case, the circuit selector 112 outputs the signal of the circuit switching bus 111 to the circuit element when the parameter representing that the operation setting is valid is set thereto. Similarly the output selector 119 outputs the signal of the circuit switching bus 111 to the external output interface part 16 when the parameter representing that the operation setting is valid is set thereto.

In contrast, if the parameter representing that the operation setting is valid is not set to the circuit selector 112, that is, nothing is set thereto, the operation setting thereto becomes invalid and hence the circuit selector does not output the signal of the circuit switching bus 111 to the circuit element. Similarly if the parameter representing that the operation setting is valid is not set to the output selector 119, that is, nothing is set thereto, the operation setting thereto becomes invalid and hence the output selector does not output the signal of the circuit switching bus 111 to the external output interface part 16. In such case, the aforesaid effect of the first embodiment can also be attained.

DESCRIPTION OF REFERENCE NUMERALS 1 programmable logic controller, 10 input/output control device, 11 general-purpose logic part, 12 operation part. 13 memory part, 15 external input interface part, 16 external output interface part, 111 circuit switching bus, 112, 112a, 112b, 112c, 112d, 112e, 112f circuit selector, 113 filter, 114 logic gate, 115 counter, 116 comparator, 117 operation part, 118 clock, 119, 119a. 119b output selector, 20 CPU device, 3 peripheral device, 31 parameter setting part, 32 operation data setting part

The invention claimed is:
1. An input/output control device comprising:
a bus that is connected to an input interface to which a signal is inputted from outside the input/output control device;
a plurality of circuit selectors that are connected to the bus and to which validity or invalidity of an operation is set, each of the plurality of circuit selectors outputting a signal of the bus when the validity is set but not outputting the signal of the bus when the invalidity is set;
a plurality of logical circuits that are respectively provided to each of the plurality of circuit selectors, each of the plurality of logical circuits performing a logical operation when a signal is inputted from a respective one of the plurality of circuit selectors and outputting a signal representing an operation result to the bus;
an output selector that is connected to the bus and to which validity or invalidity of an operation is set, the output selector outputting a signal of the bus to an output interface when the validity is set but not outputting the signal of the bus to the output interface when the invalidity is set; and
an operation part to validate or invalidate the plurality of circuit selectors or the output selector, based on an operation order of the plurality of circuit selectors and the output selector.

2. The input/output control device according to claim 1, wherein, when a signal is inputted to the bus from the input interface or the plurality of logical circuits, the operation part validates or invalidates the plurality of circuit selectors and the output selector, based on data representing the operation order of the plurality of circuit selectors and the output selector.

3. The input/output control device according to claim 2, wherein the operation part validates or invalidates the plurality of circuit selectors and the output selector, based on data that is set by a data setting part of a peripheral device outside the input/output control device.

4. The input/output control device according to claim 1, wherein the operation part causes the plurality of logical circuits to perform the logical operation, based on a parameter that is set to the plurality of logical circuits by a parameter setting part of a peripheral device outside the input/output control device.

5. An input/output control method executed by an input/output control device, the input/output control method comprising:
receiving input of a signal to a bus that is connected to an input interface to which a signal is inputted from outside the input/output control device;
validating an optional circuit selector among a plurality of circuit selectors that are connected to the bus, thereby causing the optional circuit selector to output a signal of the bus;
causing, among a plurality of logical circuits respectively provided to each of the plurality of circuit selectors, a logical circuit, to which the signal is inputted from the optional circuit selector, to perform a logical operation and output a signal to the bus; and
validating an output selector that is connected to the bus, thereby causing the output selector to output a signal of the bus to an output interface.

6. The input/output control method according to claim 5, wherein the validating the optional circuit selector comprises validating or invalidating the optional circuit selector, based on data that is set in an operation data setting step of setting data representing an operation order of the plurality of circuit selectors and the output selector, and
the validating the output selector comprises validating or invalidating the output selector, based on the data set in the operation data setting step.

7. The input/output control method according to claim 5, wherein the causing comprises causing the logical circuit to perform the logical operation, based on a parameter that is set in a parameter setting step of setting a parameter to the logical circuit.

8. A non-transitory computer-readable medium comprising a program that is installed in an input/output control device that executes a predetermined operation, according to a signal that is inputted from an input interface, and outputs a signal from an output interface, the program causing an operation part of the input/output control device to execute:
validating, when a signal is inputted to a bus that is connected to the input interface, an optional circuit selector among a plurality of circuit selectors that are connected to the bus, thereby causing the optional circuit selector to output a signal of the bus;
causing, among a plurality of logical circuits respectively provided to each of the plurality of circuit selectors, a logical circuit, to which the signal is inputted from the optional circuit selector, to perform a logical operation and output a signal to the bus; and validating an output selector that is connected to the bus, thereby causing the output selector to output a signal of the bus to the output interface.

9. The non-transitory computer-readable medium according to claim 8, further comprising:
setting data representing an operation order of the plurality of circuit selectors and the output selector,
wherein the validating the optional circuit selector comprises validating or invalidating the optional circuit selector, based on the data that is set, and
the validating the output selector comprises validating or invalidating the output selector, based on the data that is set.

10. The non-transitory computer-readable medium according to claim 8, further comprising:
setting a parameter to the logical circuit,
wherein the causing comprises causing the logical circuit to perform the logical operation, according to the parameter that is set.

\* \* \* \* \*